United States Patent [19]

Arao et al.

[11] 4,265,163

[45] May 5, 1981

[54] FUEL CONTROL SYSTEM FOR INTERNAL COMBUSTION ENGINES

[75] Inventors: Umeo Arao, Okazaki; Tsuneyuki Egami, Aichi; Tooru Kosuda; Yasuhiro Takeuchi, both of Okazaki, all of Japan

[73] Assignee: Nippon Soken, Inc., Nishio, Japan

[21] Appl. No.: 62,554

[22] Filed: Jul. 31, 1979

[30] Foreign Application Priority Data

Aug. 10, 1978 [JP] Japan ................ 53-97873

[51] Int. Cl.³ .............................................. F15B 13/16
[52] U.S. Cl. ........................................ 91/361; 91/457
[58] Field of Search ....................... 91/361, 363 R, 457, 91/454

[56] References Cited

U.S. PATENT DOCUMENTS

| | | | |
|---|---|---|---|
| 3,266,378 | 8/1966 | Shaw | 91/363 R |
| 3,295,421 | 1/1967 | McCormick | 91/363 R |
| 3,477,346 | 11/1969 | Slavin et al. | 91/457 |
| 3,618,469 | 11/1971 | Wills et al. | 91/457 |

*Primary Examiner*—Paul E. Maslousky
*Attorney, Agent, or Firm*—Cushman, Darby & Cushman

[57] ABSTRACT

The amount of axial movement of a plunger is controlled by a hydraulic servomechanism. The pressure in the hydraulic chamber of the servomechanism is controlled by opening and closing an inlet valve and outlet valve provided respectively at the inlet and outlet sides of the hydraulic chamber. When the difference value between the actual position and desired position of the plunger is greater than a first predetermined value, only one or the other of the inlet and outlet valves is energized. When the difference is intermediate the first predetermined value and a second predetermined value which is smaller than the former, the inlet and outlet valves are energized at different duty cycles. When the difference is smaller than the second predetermined value, the valves are both deenergized.

4 Claims, 15 Drawing Figures

SMALL (RICH) ← A/F → LARGE (LEAN)

FUEL CONTROL SYSTEM FOR INTERNAL COMBUSTION ENGINES

BACKGROUND OF THE INVENTION

The present invention relates to fuel injection systems for internal combustion engines, and more particularly the invention relates to a fuel injection system in which the operation of a fuel control unit for distributing and metering fuel is electro-hydraulically controlled in response to the signals from various sensors.

A fuel injection system of the above type is known in the art which includes a measuring plate positioned in the intake pipe of an engine so as to be displaced in response to the amount of air flow, whereby the displacement of the measuring plate is transmitted to a plunger through a mechanical link mechanism and the plunger is moved axially, thereby effecting the distribution and metering of the fuel.

A disadvantage of this known system is that the air flow sensor including the measuring plate is made integral with the fuel control unit for distributing and metering fuel, thus increasing the size of the system and thereby deteriorating the ease of mounting and installing the system in the limited engine room of automobiles or the like.

Another disadvantage is that since the air flow sensor and the fuel control unit are mechanically coupled, where it is desired to effect the closed loop control of air-fuel ratio by means of an oxygen sensor or it is desired to correct the fuel quantity supplied by means of an engine cooling water temperature sensor, the construction prevents the electric detection signal of the sensor from being reflected in the control system.

SUMMARY OF THE INVENTION

With a view to overcoming the deficiencies in the prior art, it is an object of the invention to provide a fuel injection system in which a plunger driving hydraulic servomechanism is controlled in accordance with the magnitudes of and the difference between the actual position and desired position of the plunger to move the plunger into the desired position with an improved response.

It is another object of the invention to provide a fuel injection system in which an air flow sensor and a fuel control unit can be mounted at different positions, thus improving the ease of installation of the system in the engine room and also facilitating the correction of the fuel injection quantity in response to the electric detection signals from the various sensors.

It is still another object of the invention to control the fuel injection quantity with an improved response and accuracy.

In accordance with the invention there is thus provided a fuel injection system wherein the amount of axial movement of the plunger in a fuel control unit is controlled by a hydraulic servomechanism and an electronic control unit calculates the desired value for fuel flow rate in response to the electric detection sinals from various sensors including an air flow sensor, etc., and also compares the desired value with the actual quantity of fuel injected to generate in accordance with their magnitudes and the difference therebetween control signals for driving the hydraulic servomechanism and thereby to drive the hydraulic servomechanism in response to the control signals.

DESCRIPTION OF THE PREFERRED EMBODIMENT

The invention will now be described in greater detail with reference to the illustrated embodiment.

Figure 1:
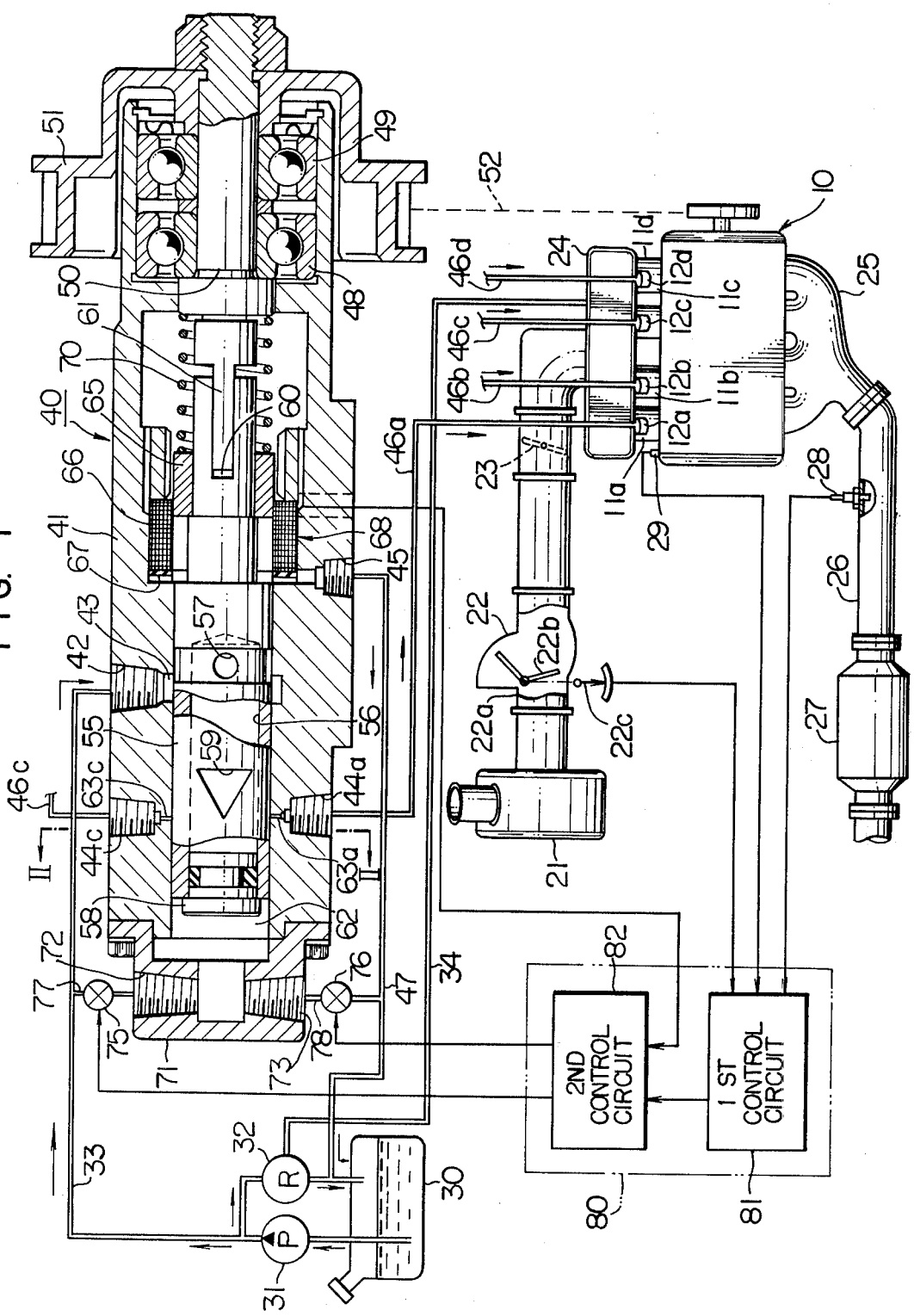
FIG. 1 is a schematic diagram showing the overall construction of an embodiment of the invention.
Figure 2:
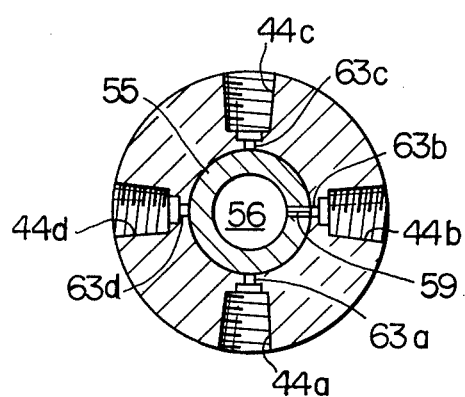
FIG. 2 is a cross-sectional view taken along the line II—II of FIG. 1.

Referring first to FIGS. 1 and 2, an internal combustion engine 10 is a known type of four-cylinder four-stroke spark ignition engine in which air is drawn through intake branch pipes 11a, 11b, 11c and 11d and fuel is injected and supplied through fuel injection valves 12a, 12b, 12c and 12d respectively provided in the branch pipes 11a to 11d.

Figure 3:
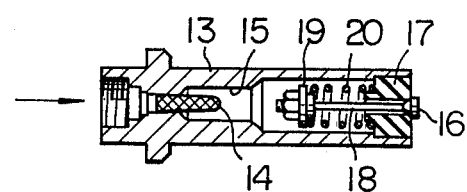
FIG. 3 is a longitudinal sectional view of the fuel injection valve shown in FIG. 1.

The fuel injection valves 12a to 12d are automatic valves such as shown in FIG. 3 in which its valve body 13 is provided with a fuel filter 14 and a fuel passage 15 and its forward portion includes a nozzle body 17 formed with a nozzle adapted to be opened and closed by a bevel-shaped valve member 16. The valve member 16 is biased in the valve closing direction by a compression spring 20 by way of a shaft 18 and a spring seat member 19, so that when the fuel pressure exceeds a predetermined value, the valve member 16 is moved to the right in the illustration and the fuel is injected through the nozzle.

Referring again to FIGS. 1 and 2, the intake air is introduced into the intake branch pipes 11a to 11d through an air cleaner 21, an air flow sensor 22, a throttle valve 23 and a surge tank 24, and the intake air quantity adjusted by the throttle valve 23 which is operable as desired is measured by the air flow sensor 22.

The air flow sensor 22 is of the known measuring plate measuring method type in which the amount of air drawn is detected by a measuring plate 22b rotatable about a shaft 22a and then converted into and generated as an electric signal by a potentiometer 22c operatively associated with the measuring plate 22a.

On the other hand, the exhaust gases from the engine 10 are discharged into an exhaust manifold 25 from which the exhaust gases are discharged to the atmosphere through an exhaust pipe 26, a three-way catalytic converter 27 and a muffler which is not shown. The three-way catalytic converter 27 is designed to simultaneously purify $NO_x$, CO and HC in the exhaust gases and it can operate with a high degree of efficiency when the air-fuel ratio of mixtures is maintained at the stoichiometric ratio.

Figure 4:
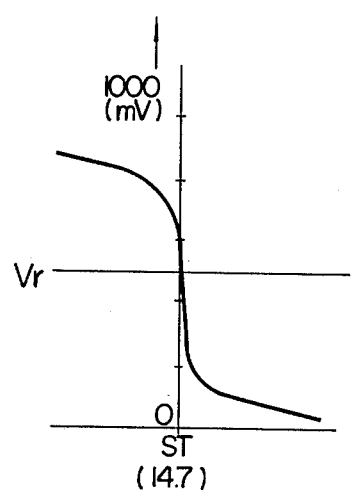
FIG. 4 is an output characteristic diagram of the oxygen sensor shown in FIG. 1.

Disposed in the exhaust pipe 26 is an oxygen sensor 28 for detecting the oxygen content of the exhaust gases. The oxygen sensor 28 comprises a porous metal oxide such as zirconia ($ZrO_2$) or titania ($TiO_2$) whose surface is coated with a catalyst such as platinum, and in the case of the sensor 28 comprising zirconia its electric detection signal rapidly changes with the stoichiometric air-fuel ratio ST as the threshold as shown in FIG. 4.

A cooling water temperature sensor 29 is disposed in the cooling water passage of the engine 10. The cooling water temperature sensor 29 comprises a temperature sensitive element such as a thermistor and it generates an electric detection signal corresponding to the cooling water temperature. The sensors 22, 28 and 29 constitute an operating condition sensor for detecting the operating condition of the engine 10 to generate the corresponding detection signal.

Figure 5:
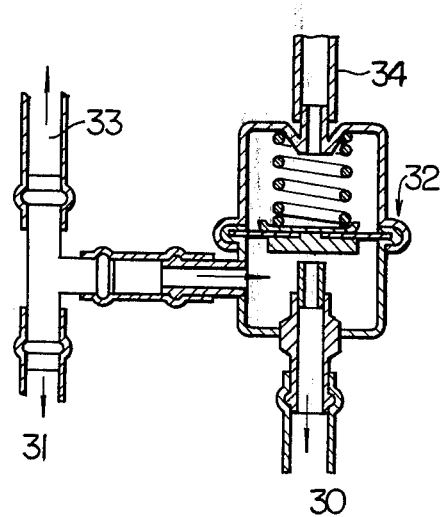
FIG. 5 is a cross-sectional view of the pressure regulator shown in FIG. 1.

Now referring to the fuel supply system, numeral 30 designates a fuel tank and the fuel is delivered by forced feed from the fuel tank 30 by an electrically operated fuel pump 31. The force-fed fuel is regulated by a pressure regulator 32 of the type shown in FIG. 5 in which the intake negative pressure introduced as a reference pressure through a pipe 34 is utilized to return the excess fuel to the fuel tank 30 and the fuel thusly regulated to a fixed pressure (2 to 10 atmospheres) is supplied to a fuel control unit 40 through a pipe 33.

The fuel control unit 40 is responsive to a hydraulic pressure signal to meter and distribute the fuel to the fuel injection valves 12a to 12d in the respective cylinders and it is mounted near the drive shaft of the engine 10 separately from the air flow sensor 22.

The fuel control unit 40 includes a cylindrical housing 41 which is formed with a single radial fuel inlet 42 and an annular groove 43 formed in the inner surface thereof to communicate with the fuel inlet 42. The housing 41 is also formed with four fuel outlets 44a to 44d (the same as the number of cylinders) which are arranged radially at equal spaces of 90° and a fuel return port 45 for returning the leaked fuel to the fuel tank 30.

The pipe 33 is connected to the fuel inlet 42, pipes 46a to 46d of the fuel injection valves 12a to 12d are respectively connected to the fuel outlets 44a to 44d, and a pipe 47 leading to the fuel tank 30 is connected to the fuel return port 45.

Two ball bearings 48 and 49 are arranged in the inner surface of the housing 41 and a rotor 50 is rotatably supported by the bearings 48 and 49. A gear 51 is threadedly mounted on the right end of the rotor 50, and the rotor 50 is driven for rotation in synchronism with the drive shaft of the engine 10 through the gear 51 and a cogged belt 52. The speed ratio between the engine 10 and the rotor 50 is set to 2:1. This ratio is used for a four-stroke engine in which one cycle is completed by two revolutions of the engine, and it preferable to set the speed ratio to 1:1 in the case of a two-stroke engine in which one cycle is completed by one revolution of the engine. Also a fuel control plunger 55 is fitted oil-tight in the inner surface of the housing 41 so as to make rotary motion and axial movement. Formed within the plunger 55 is a fuel passage 56 and also a fuel inlet port 57 is formed in the portion of the plunger 55 substantially corresponding to the fuel inlet 42 of the housing 41.

The fuel passage 56 of the plunger 55 has its one end sealed with an O-ring and a plug member 58 and a single regular triangular slit 59 is formed to distribute the fuel to the fuel outlets 44a to 44d from the fuel passage 56.

The plunger 55 is also provided with a slot 60 in the right end thereof and a projection 61 on the rotor 50 is fitted in the slot 60. The plunger 55 is rotated by the rotor 50 and it is also reciprocated axially independently of the rotor 50 by means of the hydraulic pressure introduced into a hydraulic chamber 62 formed in the left end portion of the housing 41.

The housing 41 also includes fuel metering slits 63a to 63d formed in the inner surface thereof on the inner side of the fuel outlets 44a to 44d, and the slits 63a to 63d are selectively communicated with the slit 59 of the plunger 55 to distribute and meter the fuel.

Figure 6:
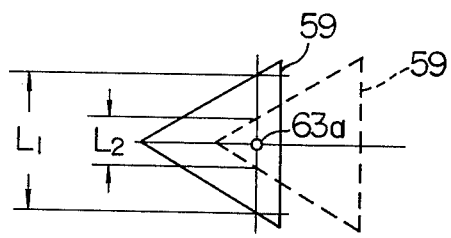
FIG. 6 is a schematic diagram showing the manner in which the slit of FIG. 1 is overlapped.

It should be noted that the distribution of the fuel is accomplished by the rotation of the plunger 55 and the fuel is metered, such as is shown in FIG. 6, in accordance with the distance of communication between the slit 63a of the housing 41 and the slit 59 of the plunger 55.

In other words, the opening area of the slits 63a to 63d is small as compared with the slit 59 and the flow rate per unit time of the fuel delivered from each of the slits 63a to 63d is substantially constant. Consequently, if the slits 59 and 63a are in a relative positional relation as shown by the solid line in FIG. 6, the distance of communication between the slits is increased as shown at $L_1$ and the amount of fuel supplied is increased. On the contrary, if the positional relation is as shown by the broken line, the distance of communication between the slits is decreased as shown at $L_2$ and the amount of fuel supplied is decreased.

Figure 7:
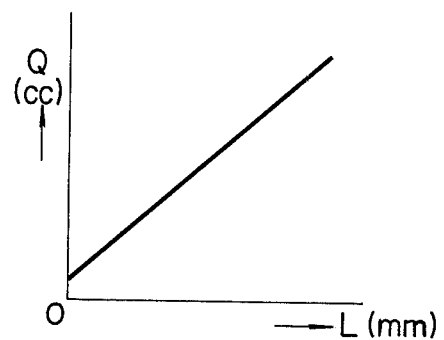
FIG. 7 is a characteristic diagram showing the relationship between the amount of plunger movement L and the amount of fuel injected.

In other words, if the number of revolutions of the plunger 55 or that of the engine 10 is constant, the fuel quantity Q (cc) delivered from each of the fuel outlets 44a to 44d is determined only by the amount of axial movement L (mm) of the plunger 55. Where the slit 59 is in regular triangular form, the relationship between the fuel quantity Q and the amount of movement L becomes as shown in FIG. 7 and the fuel can be metered in accordance with the position of the plunger 55.

The amount of movement L of the plunger 55 is detected by a plunger position sensor 68 comprising an annular core 65 fixedly mounted on the plunger 55 and primary and secondary coils 66 and 67 which are fixed to the housing 41. The plunger position sensor 68 is of the known differential transformer type which produces an electromotive force corresponding to the amount of movement of the plunger 55.

The plunger 55 is biased to the left in the illustration by a compression coiled spring 70 and it is also biased to the right in the illustration by the hydraulic pressure introduced into the hydraulic chamber 62. A part of the hydraulic chamber 62 is defined by a cover 71 attached to the end of the housing 41 and the cover 71 is formed with a fuel inlet 72 and a fuel outlet 73 which are adapted to regulate the hydraulic pressure in the hydraulic chamber 62.

Numerals 75 and 76 designate electromagnetic valves forming a hydraulic servomechanism for positioning the plunger 55 and they are each opened only in response to the application of an ON signal. The electromagnetic valve 75 is positioned in a pipe 77 connecting the pipe 33 to the inlet 72 and the other electromagnetic valve 76 is positioned in a pipe 72 connecting the outlet 73 to the pipe 47. When the electromagnetic valve 75 is open and the electromagnetic valve 76 is closed, the hydraulic pressure in the hydraulic chamber 62 is increased and the plunger 55 is moved to the right in the illustration against the force of the spring 70. On the contrary, when the electromagnetic valve 76 is open, the hydraulic pressure in the hydraulic chamber 62 is decreased and the plunger 55 is moved to the left in the illustration by the force of the spring 70. Thus, the position and the amount of movement of the plunger 55 are adjusted in accordance with the duration of opening and closing of the electromagnetic valves 75 and 76.

An electronic control unit 80 is responsive to the detection signals from the sensors 22, 28, 29 and 68 to open and close the electromagnetic valves 75 and 76 and more particularly the unit 80 comprises first and second control circuits 81 and 82.

The first control circuit 81 has its input terminals electrically connected to the sensors 22, 29 and 28 and its output terminal connected to the second control circuit 82, whereby in response to the detection signals from the sensors 22, 28 and 29 the desired value of fuel quantity is calculated to adjust the ratio of the fuel to air which are to be supplied to the engine 10 or the air-fuel ratio to a predetermined value.

The second control circuit 82 has its input terminals electrically connected to the plunger position sensor 68 and the first control circuit 81 and its output terminals connected electrically to the electromagnetic valves 75 and 76 of the hydraulic servomechanism, whereby in accordance with the error or difference between the desired value calculated by the first control circuit 81 and the position of the plunger 55 detected by the plunger position sensor 68 or the fuel quantity (the actual fuel quantity) supplied currently to the engine 10, that is, their magnitudes and the deviation, the opening and closing of the electromagnetic valves 75 and 76 are controlled to bring the fuel injection quantity to the desired value.

Figure 8:
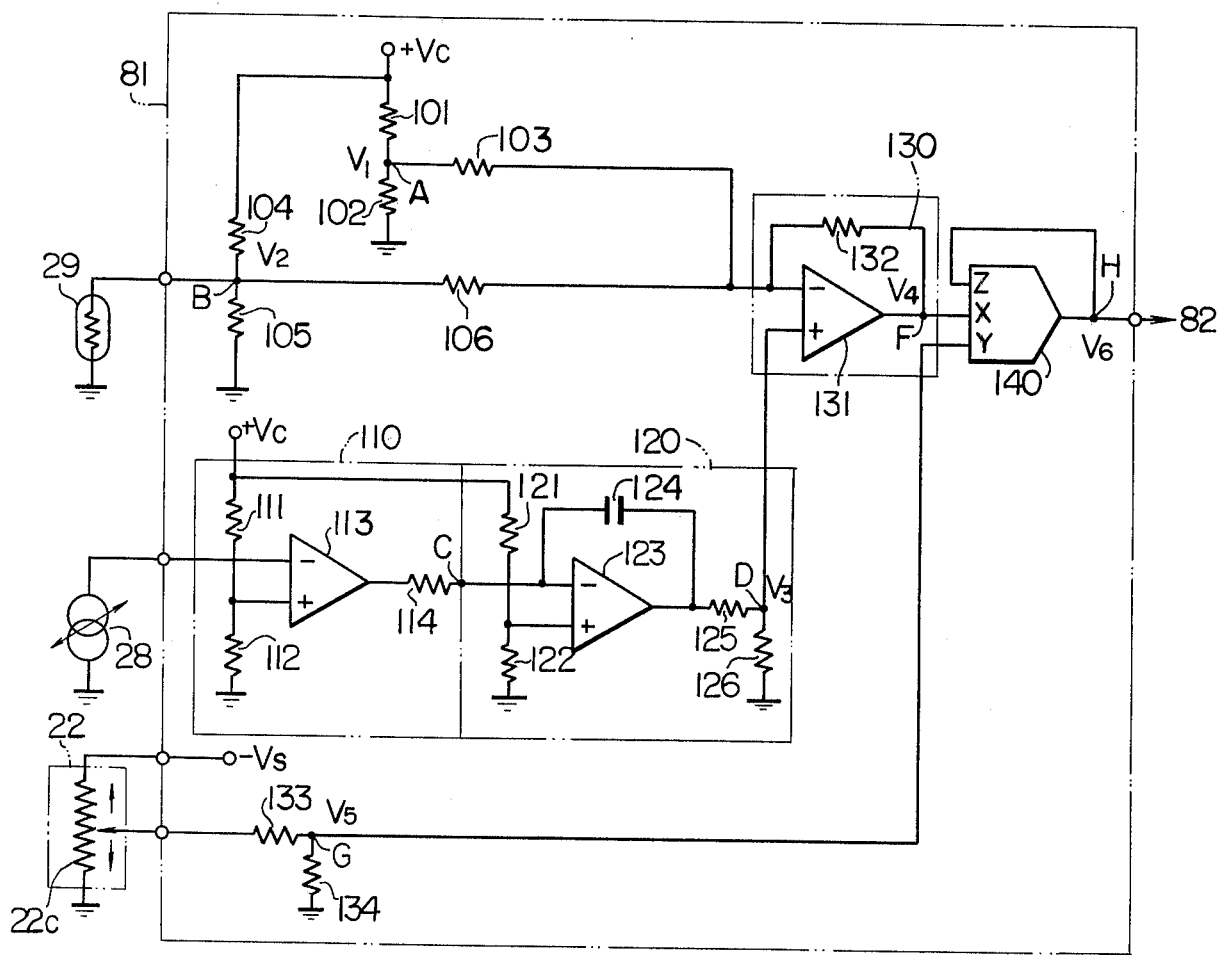
FIG. 8 is a circuit diagram of the first control circuit shown in FIG. 1.

Referring now to FIG. 8, the first control circuit 81 will be described in greater detail. Resistors 101 and 102 are provided to divide a supply voltage $V_c$ and generate a predetermined voltage $V_1$, and the voltage $V_1$ at a terminal A is delivered by way of a resistor 103.

Resistors 104 and 105 are operative in association with a positive characteristic thermistor constituting the water temperature sensor 29 so as to generate a voltage $V_2$ corresponding to the engine cooling water temperature, and the voltage $V_2$ at a terminal B is delivered by way of a resistor 106.

A comparator circuit 110 is provided to compare the output voltage of the oxygen sensor 28 shown in FIG. 4 with a reference voltage $V_r$ and it comprises resistors 111 and 112 for dividing the supply voltage $V_c$ to generate the reference voltage $V_r$, a comparator 113 and an output resistor 114. A "0" level signal is generated from its terminal C when the output voltage of the oxygen sensor 28 exceeds the reference voltage $V_r$ and a "1" level signal is generated from the terminal C when the sensor output voltage becomes lower than the reference voltage $V_r$.

An integrator circuit 120 is a circuit for integrating the output voltage of the comparator circuit 110 and it comprises resistors 121 and 122 for generating a predetermined integration reference voltage, an operational amplifier (OP amplifier) 123, a capacitor 124 and resistors 125 and 126 for dividing the output voltage of the OP amplifier 123. A voltage $V_3$ corresponding to the oxygen content of the exhaust gases from the engine 10 is generated from its terminal D.

A differential amplifier 130 performs the operation of $V_3 - V_1 - V_2$ and it comprises an OP amplifier 131 and a feedback resistor 132 to generate from its terminal F a voltage $V_4 (= V_3 - V_1 - V_2)$.

Voltage dividing resistors 133 and 134 are provided to divide the output voltage of the potentiometer 22c constituting the air flow sensor 22 and a voltage $V_5$ corresponding to the amount of air drawn into the engine 10 is generated from a terminal G. A voltage $-V_s$ is applied to the potentiometer 22c from a power source which is not shown.

A multiplier 140 produces the product of its input voltages and it comprises for example the Intersil IC 8013, whereby generating from its terminal H a voltage $V_6 (= V_4 \times V_5 = (V_3 - V_1 - V_2) \times V_5)$.

The output voltage $V_4$ of the differential amplifier 130 will now be described in greater detail. Assuming that the voltage $V_1$ or the reference value is 1 and hence the voltages $V_2$ and $V_3$ are represented by $\Delta 1$ and $\Delta 2$, then the voltage $V_4$ is given by the following equation $$V_4 = -(1 + \Delta 1 - \Delta 2).$$

Assuming that $\Delta 1$ is 1 with respect to the reference value when the cooling water temperature is 80° C., the value of $\Delta 1$ changes to 0 when the water temperature is higher than 80° C., to 1 at $-20°$ C. and to 2 at $-30°$ C.

The value of $\Delta 2$ varies in the range of ±20% with respect to the reference value. In other words, the output voltage of the oxygen sensor 28 varies in accordance with the air-fuel ratio A/F of mixtures as shown in FIG. 4 and consequently the comparator circuit 110 generates a "1" or "0" level signal. While the integrator circuit 120 integrates with a positive slope when the output of the comparator circuit 110 is at the "0" level and it integrates with a negative slope when the output is at the "1" level, it is preset so that the maximum integrated value varies in the range of ±20% with respect to the reference value. As a result, the output voltage of the integrator circuit 120 takes the form of a triangular wave which varies in the range of $-0.2 V_1$ to $+0.2 V_1$ with respect to the reference value $V_1$.

On the other hand, since the voltage $V_5$ assumes a value corresponding to the amount of air flow and the voltage $V_4$ assumes a value as mentioned previously, the output voltage $V_6$ of the multiplier 140 is basically proportional to the amount of air flow and it is further subjected to a cooling water temperature compensation and another compensation for causing the air-fuel ratio to approach the stoichiometric ratio.

Figure 9:
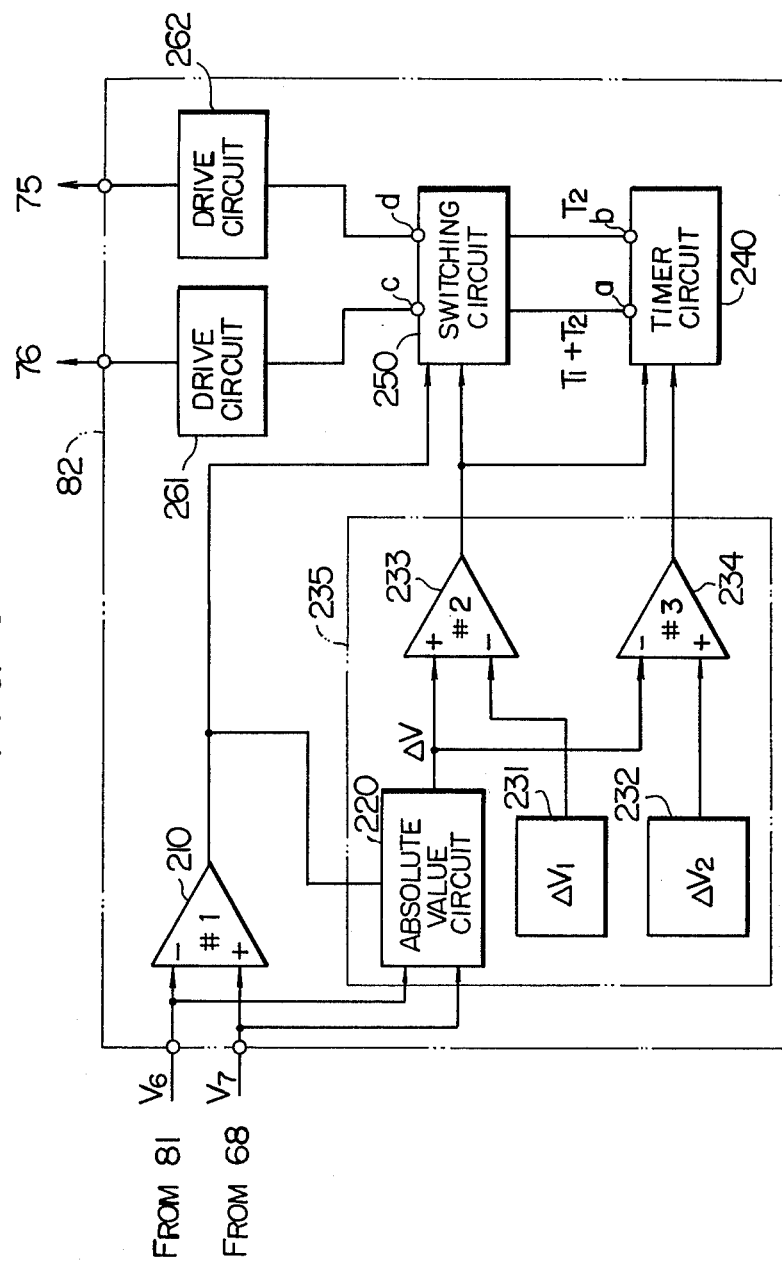
FIG. 9 is a block diagram for the second control circuit shown in FIG. 1.

Next, the second control circuit 82 will be described with reference to FIG. 9. A first comparator 210 is a circuit which compares the output voltage $V_6$ of the first control circuit 81 with the output voltage $V_7$ of the plunger position sensor 68, whereby its output signal goes to the "1" level when the voltage $V_6$ is higher than the voltage $V_7$ and the output signal goes to the "0" level when the voltage $V_6$ is lower than the voltage $V_7$.

An absolute value circuit 220 calculates and generates the deviation or difference $\Delta V (= |V_6 - V_7|)$ between the voltages $V_6$ and $V_7$.

Voltage generators 231 and 232 are provide to respectively generate predetermined voltages $\Delta V_1$ and $\Delta V_2$ and are each comprised of a known type of voltage dividing resistor.

Second and third comparators 233 and 234 are of the same type as the first comparator 210, and the second comparator 233 generates a signal which goes to the "1" level when the voltage difference $\Delta V$ is greater than the predetermined value $\Delta V_1$ and goes to the "0" level when the voltage difference $\Delta V$ is smaller than the predetermined value $\Delta V_1$. The third comparator 234 generates a signal which goes to the "1" level when the voltage difference $\Delta V$ is smaller than the predetermined value $\Delta V_2$ and goes to the "0" level when the voltage difference is greater than the predetermined value $\Delta V_2$. The circuits 220, 231, 232, 233 and 234 constitute a circuit 235 for calculating the difference between the voltages $V_6$ and $V_7$.

A timer circuit 240 is responsive to the output signals of the second and third comparators 233 and 234 to generate pulse signals respectively having pulse widths $T_2$ and $(T_1+T_2)$ at intervals of a time $(T_1+T_2+T_3)$ and more particularly it is designed so that a "0" level signal is generated from each of its terminals a and b when the output of the third comparator 234 is at the "1" level or only for a time period $T_D$ after the output of the second comparator 233 changes from the "1" to "0" level, and the previously mentioned pulse signals are generated in all other conditions.

In other words, a pulse signal of the pulse width $(T_1+T_2)$ and a pulse signal of the pulse width $T_2$ are respectively generated from the terminals a and b at intervals of the time $(T_1+T_2+T_3)$.

A switching circuit 250 comprises a number of different logic gates to selectively deliver the outputs at its terminals c and d in response to the output of the second comparator 233, whereby the output of the first comparator 210 is applied to drive circuits 261 and 262 from the terminals c and d, respectively, when the output of the second comparator 233 is at the "1" level and the outputs of the timer circuit 240 are applied to the drive circuits 261 and 262 when the output of the second comparator 233 is at the "0" level.

The drive circuits 261 and 262 are circuits for amplifying the outputs of the switching circuit 250 to open and close the electromagnetic valves 75 and 76, and the circuits are each designed so that the associated electromagnetic valve is energized and opened in response to the application of a "1" level signal and the electromagnetic valve is deenergized and closed in response to the application of a "0" level signal.

Figure 10:
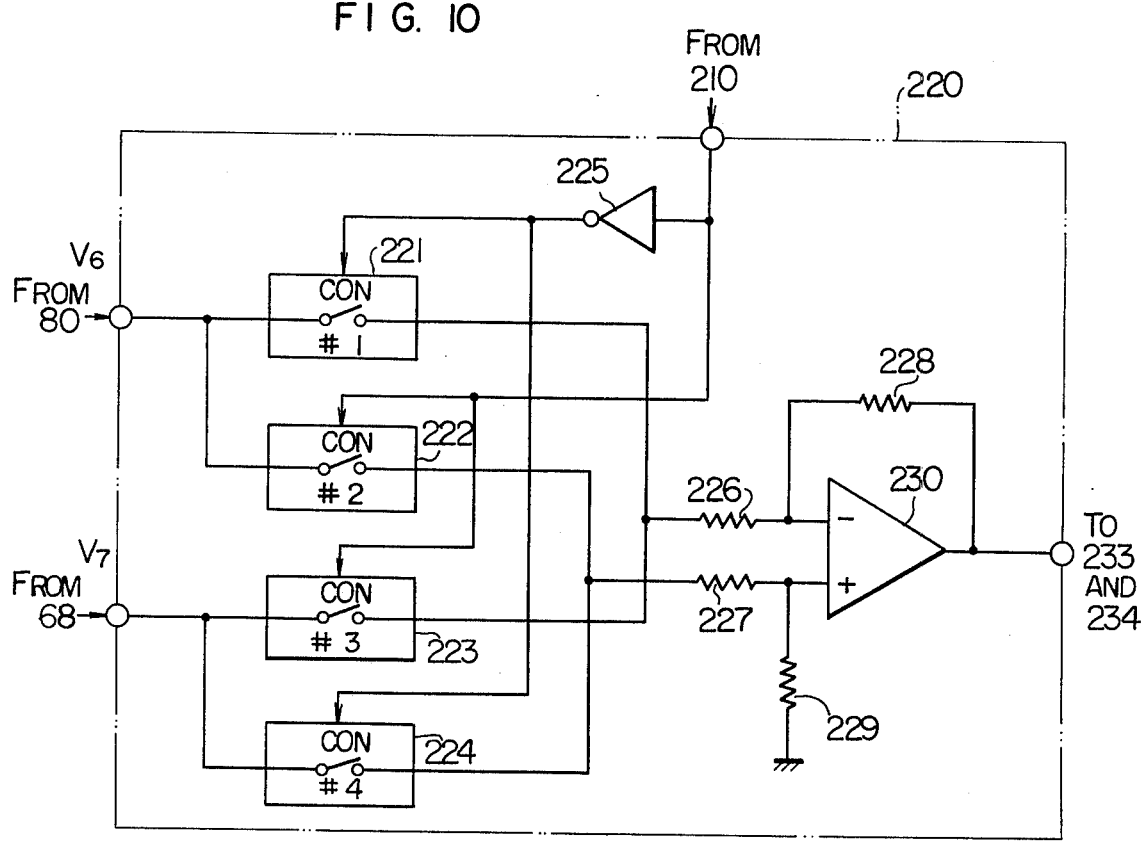
FIG. 10 is a circuit diagram of the absolute value circuit shown in FIG. 9.

The absolute value circuit 220 will now be described in greater detail with reference to FIG. 10 and it comprises first to fourth analog switches 221 to 224, an inverter 225, resistors 226 to 229 and an operational amplifier or OP amplifier 230.

The analog switches may each for example be comprised of the RCA CD4066, whereby the analog switch is turned on when a "1" level signal is applied to its control terminal CON and the analog switch is turned off when a "0" level signal is applied to the same terminal.

The OP amplifier 230 may for example be comprised of the RCA CA3130 and the OP amplifier 230 forms, with the resistors 226 to 229, a differential amplifier.

When the voltages $V_6$ and $V_7$ are $V_6 > V_7$, the first comparator 210 generates a "1" level signal so that the second and the third analog switches 222 and 223 are turned on and the voltages $V_6$ and $V_7$ are respectively applied to the noninverting and inverting input terminals (+) and (−) of the OP amplifier 230.

On the contrary, when $V_6 < V_7$, the first comparator 210 generates a "0" level signal so that the first and fourth analog switches 221 and 224 are turned on and consequently the voltages $V_7$ and $V_6$ are respectively applied to the terminals (+) and (−) of the OP amplifier 230.

In this way, one of the voltages $V_6$ and $V_7$ which is higher than the other is always applied to the terminal (+) and consequently the OP amplifier 230 generates a voltage representing the $|V_6 - V_7|$.

Figure 11:
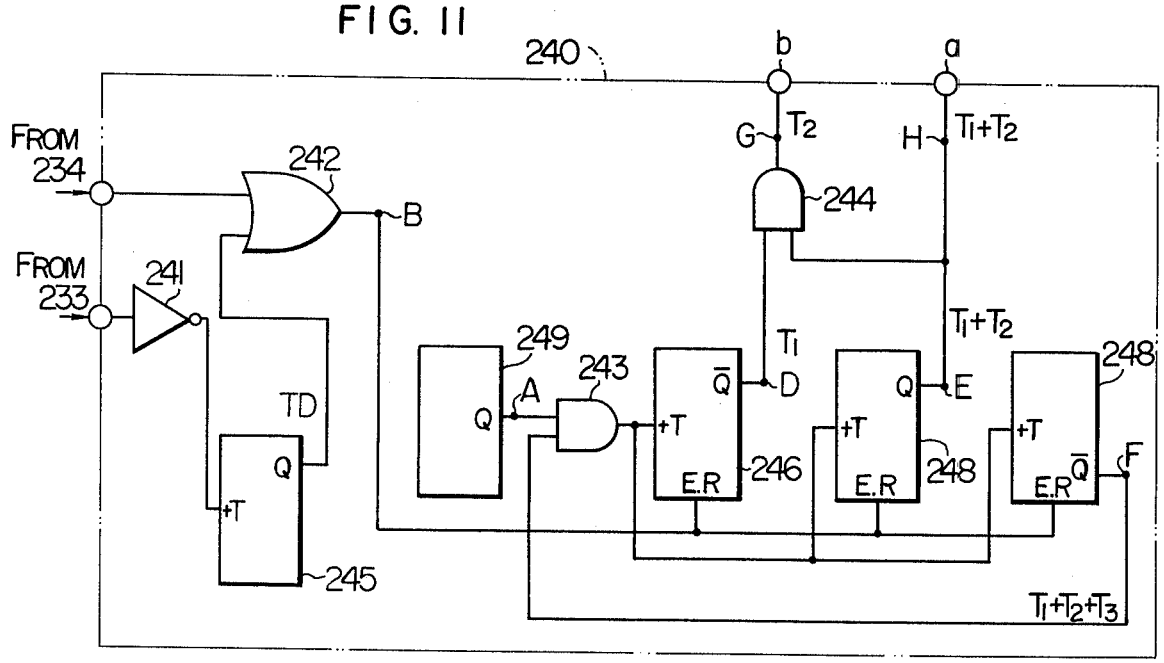
FIG. 11 is a circuit diagram of the timer circuit shown in FIG. 9.

Next, the timer circuit 240 will be described with reference to FIG. 11 in which the circuit comprises an inverter 241, an OR gate 242, AND gates 243 and 244, monostable multivibrators 245 to 248 and an astable multivibrator 249.

The multivibrators 245 and 249 may each for example be comprised of the RCA CD4047, that is, the multivibrators 245 to 248 may each be used to function as a monostable multivibrator and the multivibrator 249 may be used to function as an astable multivibrator.

Each of the monostable multivibrators 245 to 248 is so designed that when a trigger pulse which goes from the "0" to "1" level is applied to its + trigger terminal +T, a rectangular pulse is generated whose pulse width is determined by its externally connected capacitor and resistor (not shown). More specifically, the monostable multivibrators 245, 246, 247 and 248 respectively generate pulses of pulse widths $T_D$, $T_1$, $T_1+T_2$ and $T_1+T_2+T_3$.

Figure 13:
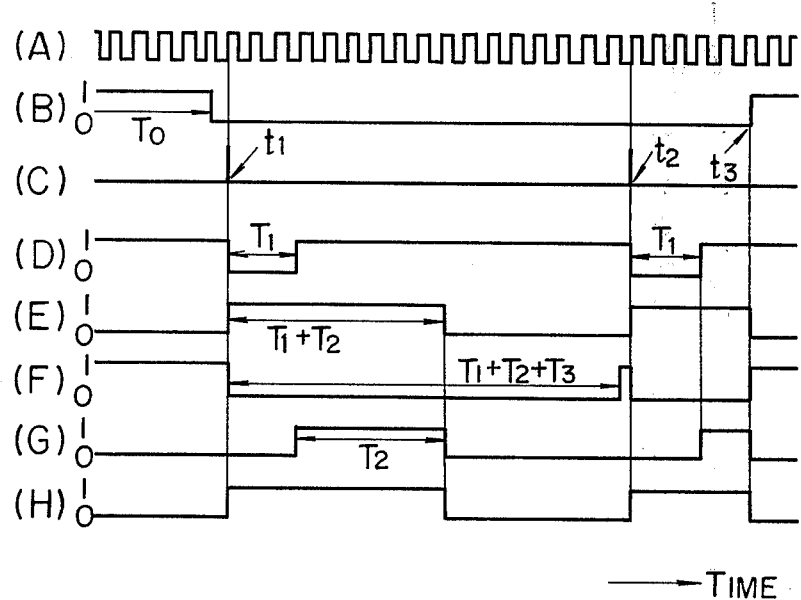
FIGS. 13, 14 and 15 are graphs useful for explaining the operation of the embodiment.

The astable multivibrator 249 generates a trigger pulse for triggering the monostable multivibrators 246 to 248 and the trigger pulse is in the form of a rectangular pulse having an oscillation period which is sufficiently short as compared with the times $T_1$, $T_2$ and $T_3$ as shown in (A) of FIG. 13.

The circuit elements 241, 242, 244 and 245 are designed so that the output at each of the terminals a and b goes to the "0" level in a predetermined condition, and when the output of the second comparator 233 goes from the "1" to "0" level the monostable multivibrator 245 is triggered to generate a "1" level signal only for the time $T_D$.

The OR gate 242 receives the Q output of the monostable multivibrator 245 and the output of the third comparator 234 and it generates a "1" level reset signal when any one or more of the inputs goes to the "1" level. The output of the OR gate 242 is applied to the external reset terminals ER of the monostable multivibrators 246 to 248, so that when the output of the OR gate 242 goes to the "1" level as shown at the period $T_0$ in (B) of FIG. 13, irrespective of the trigger pulse applied to the terminals +T the monostable multivibrators 246 and 248 respectively generate a "1" level signal from their $\overline{Q}$ terminals as shown in (D) and (F) of FIG. 13 and the monostable multivibrator 247 generates a "0" level signal as shown in (E) of FIG. 13.

As a result, the outputs at the terminals a and b respectively go to the "0" level as shown in (G) and (H) of FIG. 13.

When the output of the OR gate 242 goes to the "0" level, the reset state of the monostable multivibrators is released. When the $\overline{Q}$ output of the monostable multivibrators 248 is at the "1" level in this released condition, the AND gate 243 is opened and a trigger pulse is applied from the astable multivibrator 249 to the respective monostable multivibrators.

This trigger pulse causes the $\bar{Q}$ output of the monostable multivibrators 246 and 248, respectively, to go from the "1" to "0" level and the Q output of the monostable multivibrator 247 to go from the "0" to "1" level as shown at a time $t_1$ in FIG. 13, thus placing the multivibrators in the quasi-stable state.

Since the quasi-stable state of the monostable multivibrators or the corresponding time widths are $T_1$, $T_1+T_2$ and $T_1+T_2+T_3$, a pulse having the time width $T_1+T_2$ as shown in (H) of FIG. 13 is generated from the terminal a and a pulse of the pulse width $T_2$ is generated from the terminal b at the expiration of the time $T_1$ after the output from the terminal a.

At the expiration of the time $T_1+T_2+T_3$ after the time $t_1$ the $\bar{Q}$ output of the monostable multivibrator 248 goes to the "1" level, so that at a time $t_2$ the monostable multivibrators are again triggered to perform again the previously mentioned operations and then the monostable multivibrators are again reset in response to the transition to the "1" level of the output of the OR gate 242 at a time $t_3$.

Figure 12:
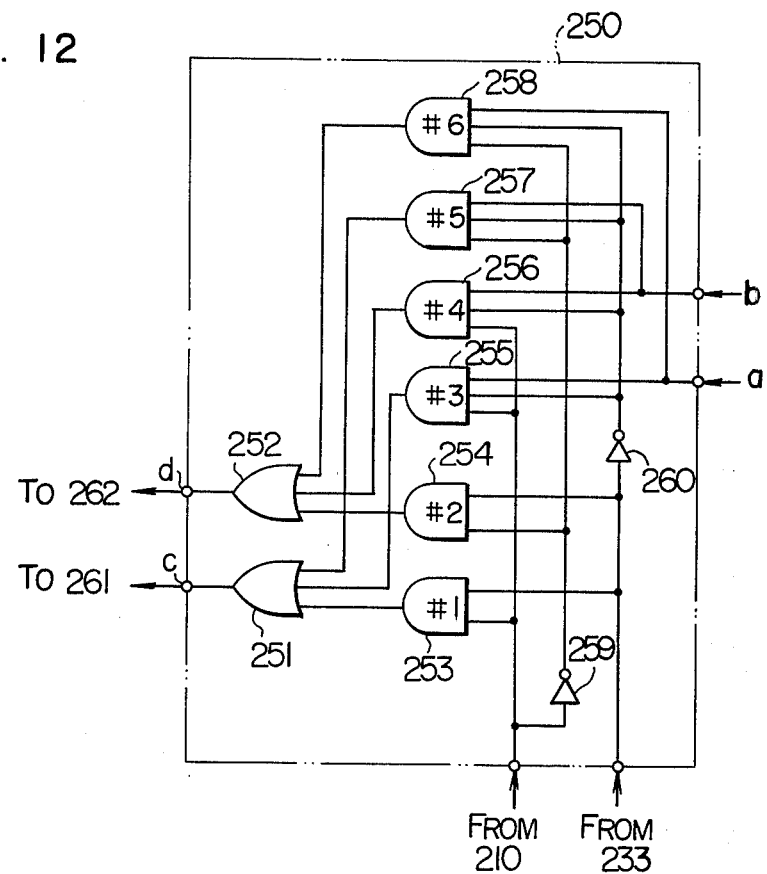
FIG. 12 is a circuit diagram of the switching circuit shown in FIG. 9.

Next, the switching circuit 250 will be described with reference to FIG. 12 in which the circuit 250 comprises OR gates 251 and 252, AND gates 253 and 258 and inverters 259 and 260.

When the output of the second comparator 233 goes to the "1" level, the first and second AND gates 253 and 254 are opened and the output of the first comparator 210 and its inverted output are respectively generated from the terminals c and d by way of the OR gates 251 and 252. In other words, a "1" level signal and "0" level signal are generated from the terminals c and d when the output of the first comparator 210 is at the "1" level and a "0" level signal and "1" level signal are respectively generated from the terminals c and d when the output of the first comparator 210 is at the "0" level.

On the other hand, when the output of the second comparator 233 goes to the "0" level and the output of the first comparator 210 is at the "1" level, the third and fourth AND gates 255 and 256 are opened and the outputs from the terminals a and b of the timer circuit 240 are delivered respectively from the terminals c and d.

When the output of the second comparator 233 is at the "0" level and the output of the first comparator 210 is also at the "0" level, the fifth and sixth AND gates 257 and 258 are opened and the outputs generated from the terminals a and b of the timer circuit 240 are respectively delivered from the terminals d and c.

With the construction described above, the fuel which was force-fed by the fuel pump 31 and then regulated to a predetermined pressure by the pressure regulator 32, is introduced into the fuel control unit 40 through the pipe 33.

The fuel flows into the fuel inlet 42 of the housing 41 and then the fuel flows from the annular groove 43 into the fuel passage 56 of the plunger 55 through the fuel inlet port 57. When the slit 59 overlaps and communicates with one of the slits 63a to 63d corresponding to the rotational position of the plunger 55, the fuel entered the fuel passage 56 flows through the slit 59 into one of the slits 63a to 63d overlapping the former and the fuel is then supplied to one of the fuel injection valves 12a to 12d through one of the fuel outlets 44a to 44d and the pipes 46a to 46d, respectively. The fuel supplied to the fuel injection valves 12a to 12d is injected into the intake branch pipes 11a to 11d of the corresponding cylinders in the engine 10.

The plunger 55 is rotated by the rotor 50 once for every two revolutions of the engine 10 and the housing 41 includes the four slits 63a to 63d and the four fuel outlets 44a to 44d. As a result, the previously mentioned operation distributes the fuel to each of the fuel outlets 44a to 44d of the housing 41 once for every two revolutions of the engine 10 and consequently the fuel is also supplied to each of the fuel injection valves 12a to 12d of the respective cylinders once for every two revolutions of the engine 10. Two revolutions of the engine 10 corresponds to one cycle and the fuel is always injected into the respective cylinders of the engine 10 on the proper stroke. This fuel injection is intermittent injection for the respective cylinders.

The metering of fuel to be injected is effected by the axial reciprocating movement of the plunger 55 and the position of the plunger 55 is adjusted by the hydraulic pressure in the hydraulic chamber 62.

This hydraulic pressure is regulated by the hydraulic servomechanism including the electromagnetic valves 75 and 76 and the electronic control unit 80 for controlling the electromagnetic valves 75 and 76 in response to the signals from the sensors 22, 27, 28 and 68, and consequently the position of the plunger 55 is properly controlled in accordance with the operating conditions of the engine 10.

Also the fuel injected from each of the fuel injection valves 12a to 12d is always metered properly in accordance with the operating conditions of the engine 10. In other words, in response to the detection signals from the sensors 22, 28 and 29 the first control circuit 81 calculates the desired fuel quantity of the engine 10 and a voltage $V_6$ which represents the desired fuel quantity is applied to the second control circuit 82.

The second control circuit 82 compares the voltage $V_6$ with the voltage $V_7$ from the plunger position sensor 68 which is indicative of the actual quantity of fuel injected so as to determine whether the actual fuel injection quantity is greater or smaller than the desired fuel quantity.

This determination is accomplished by the first comparator 210, that is, when the actual fuel injection quantity is smaller than the desired fuel quantity so that $V_7 < V_6$, the first comparator 210 generates a "1" level signal, whereas when the actual fuel injection quantity is greater than the desired fuel quantity so that $V_7 > V_6$, the first comparator 210 generates a "0" level signal.

Basically, the opening of the electromagnetic valves 75 and 76 is controlled in accordance with the output of the first comparator 210, that is, when the first comparator 210 generates a "1" level signal, the duration of opening of the electromagnetic valve 76 is increased so that a portion of the fuel in the hydraulic chamber 62 is returned to the tank 30 and the hydraulic pressure in the hydraulic chamber 62 is decreased, thus moving the plunger 55 to the left in FIG. 1 and thereby increasing the amount of fuel injected.

On the contrary, when the first comparator 210 generates a "0" level signal, the duration of opening of the electromagnetic valve 75 is increased so that the hydraulic pressure in the hydraulic chamber 62 is increased and the plunger 55 is moved to the right in FIG. 1, thus decreasing the amount of fuel injected.

The difference computing circuit 235 of the second control circuit 82 detects the difference $\Delta V$ between the voltage $V_6$ indicative of the desired value and the voltage $V_7$ indicative of the actual fuel injection quantity, so that whether the difference is greater or smaller than the predetermined value $\Delta V_1$ or whether the difference is greater or smaller than the predetermined value $\Delta V_2$ is determined to select the desired control mode of the electromagnetic valves 75 and 76 in accordance with the value of the difference $\Delta V$.

Figure 14:
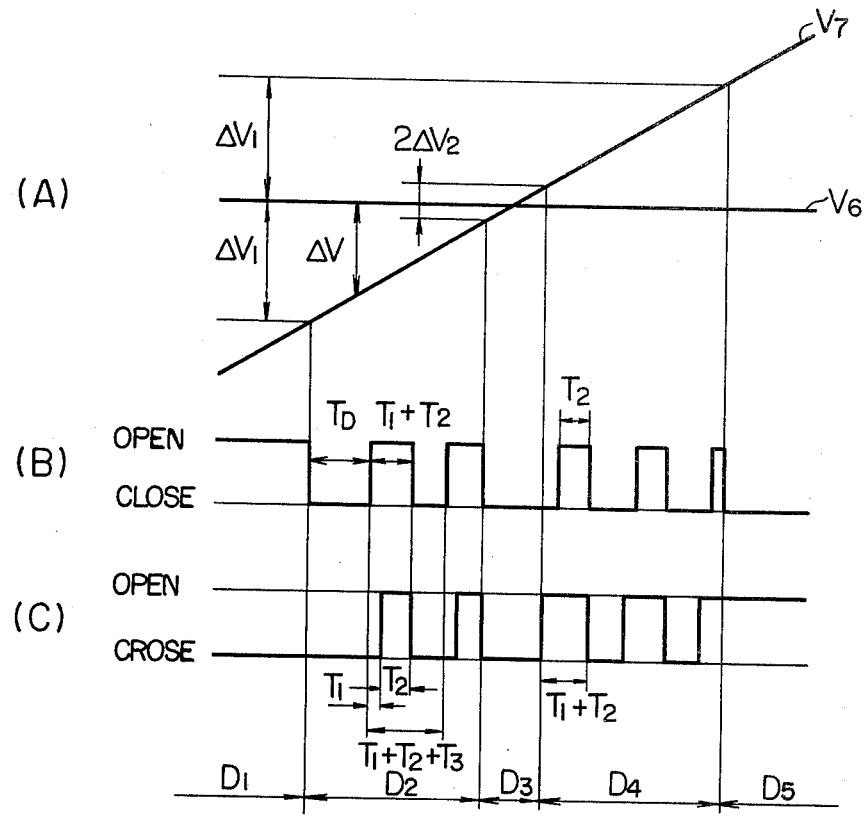

In other words, when the difference $\Delta V$ is greater than the first predetermined value $V_1$ as shown at the periods $D_1$ and $D_5$ in (A) of FIG. 14, the second comparator 233 generates a "1" level signal and the third comparator 234 generates a "0" level signal.

When this occurs, the first and second AND gates 253 and 254 of the switching circuit 250 are opened and the output of the first comparator 210 and its inverted output are respectively applied to the drive circuits 261 and 262.

As a result, when the voltage $V_7$ is lower than the voltage $V_6$ such as during the period $D_1$ in FIG. 14, in accordance with the output of the first comparator 210 a "1" level signal is applied to the drive circuit 261 and a "0" level signal is applied to the drive circuit 262. Consequently, the electromagnetic valve 75 is continuously closed as shown at the period $D_1$ in (B) of FIG. 14 and the electromagnetic valve 76 is continuously opened as shown at the period $D_1$ in (C) of FIG. 14, thus increasing the amount of fuel injected.

On the other hand, when the voltage $V_7$ is higher than the voltage $V_6$ as shown at the period $D_5$ in FIG. 14, a "0" level signal is applied to the drive circuit 261 and a "1" level signal is applied to the drive circuit 262. Consequently, the electromagnetic valve 75 is continuously opened as shown at the period $D_5$ in (C) of FIG. 14 and the electromagnetic valve 76 is closed continuously as shown at the period $D_5$ in (B) of FIG. 14, thus decreasing the amount of fuel injected.

In this way, when the difference $\Delta V$ is greater than the first predetermined value $\Delta V_1$, the previously mentioned basic control is accomplished to cause the actual fuel injection quantity to approach the desired value.

When the difference $\Delta V$ is smaller than the first predetermined value $\Delta V_1$ but greater than the second predetermined value $\Delta V_2$, each of the second and third comparators 233 and 234 generates a "0" level signal.

Consequently, in accordance with the output of the first comparator 210 the third and fourth AND gates 255 and 256 or the fifth and sixth AND gates 257 and 258 of the switching circuit 250 are opened. On the other hand, the timer circuit 240 generates from its terminal a a pulse signal of the pulse width $T_1+T_2$ at the expiration of the time $T_d$ after the transition from the "1" to "0" level of the output of the second comparator 233 and at the expiration of the time $T_1$ thereafter a pulse signal of the pulse width $T_2$ is generated from the terminal b.

In this case, if a "1" level signal is being generated from the first comparator 210, the pulse signal of the pulse width $T_1+T_2$ is applied to the drive circuit 261 and the pulse signal of the pulse width $T_2$ is applied to the drive circuit 262. Consequently, the electromagnetic valve 76 is opened and closed as shown at the period $D_2$ in (B) of FIG. 14 and the electromagnetic valve 75 is opened and closed as shown at the period $D_2$ in (C) of FIG. 14.

In this case, since during the period $D_2$ the duration of opening of the electromagnetic valve 76 is longer than that of the electromagnetic valve 75 by $nT_1$ (wherein n is an integer and n=2 in FIG. 14), the hydraulic pressure in the hydraulic chamber 62 is decreased by a small amount and the amount of fuel injection is increased.

On the contrary, if the output signal of the first comparator 210 is at the "0" level, the electromagnetic valves 75 and 76 are opened and closed as shown at the period $D_2$ in FIG. 14. In this case, the duration of opening of the electromagnetic valve 75 is longer than that of the electromagnetic valve 76 by the $nT_1$ and consequently the hydraulic pressure in the hydraulic chamber 62 is increased slightly and the amount of fuel injected is decreased.

When the difference $\Delta V$ becomes smaller than the second predetermined value as shown at the period $D_3$ in FIG. 14, the second comparator 233 generates a "0" level signal and the third comparator 234 generates a "1" level signal.

As a result, the "1" level signal is applied to the OR gate 242 of the timer circuit 240 and the monostable multivibrators 246 to 248 are reset. Consequently, a "0" level signal is generated from each of the terminals a and b and the signals are applied to the drive circuits 261 and 262 through the switching circuit 250, thus closing the electromagnetic valves 76 and 75 as shown at the period $D_3$ in (B) and (C) of FIG. 14. In other words, it is considered that the actual fuel injection quantity is within the required accuracy limits of the desired value and the hydraulic pressure in the hydraulic chamber 62 is maintained.

Figure 15:
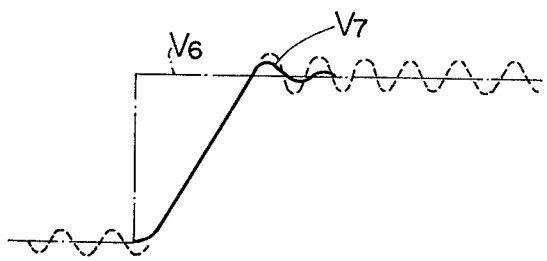

In this way, the amount of fuel injected is controlled with an improved response and a high degree of accuracy. This fact is illustrated in FIG. 15, and if the voltage $V_6$ indicative of the desired value varies as shown by the chain line in the Figure and if the control is effected only in accordance with the output of the first comparator 210 without the difference detecting circuit 235, the voltage $V_7$ will include a ripple as shown by the broken line in FIG. 15, thus making it impossible to effect the control with a high degree of accuracy.

In accordance with the invention the voltage $V_7$ will vary as shown by the solid line in the Figure and the control will be effected with a greater accuracy.

While, in the embodiment described above, the electronic control unit 80 receives the signals from the air flow sensor 22, the oxygen sensor 28 and the water temperature sensor 29, the signals from other sensors including an intake air temperature sensor, atmospheric pressure sensor, engine rotational speed sensor and vehicle speed sensor may be applied additionally to the electronic control unit 80 so as to further improve the calculation accuracy of the desired air-fuel ratio value for the engine.

Further, while the spring 70 is used to provide the required force for biasing the plunger 55 to the left, it is possible to provide the required biasing force by forming another hydraulic chamber in the right end of the plunger 55 and introducing a predetermined hydraulic pressure into the chamber through a suitable orifice.

Further, while the plunger position sensor 68 comprises a differential transformer, the sensor 68 may be comprised of a potentiometer.

We claim:
1. A system for controlling the position of plunger means comprising:
a source of hydraulic medium;
a pump for pressurizing the hydraulic medium;
a housing having a closed end;

plunger means slidably fitted inside said housing, said plunger means forming with said housing a hydraulic chamber;

biasing means for biasing said plunger means axially;

an inlet passage communicated with said pump and said hydraulic chamber for delivering the pressurized hydraulic medium from the pump to the hydraulic chamber to thereby bias said plunger means against said biasing means;

an outlet passage communicated with said hydraulic chamber and said source of hydraulic medium for returning the hydraulic medium from the hydraulic chamber to the source of hydraulic medium;

an inlet electromagnetic valve positioned in said inlet passage for opening and closing said inlet passage;

an outlet electromagnetic valve positioned in said outlet passage for opening and closing said outlet passage;

a position sensor for sensing an actual position of said plunger means generating an actual position signal indicative thereof;

calculation means for calculating a variable desired position for said plunger means;

first comparison means, connected to said position sensor and said calculation means, for determing whether the pressure in said hydraulic chamber is to be increased or decreased, by comparing the desired position of said plunger means, calculated by said calculation means, with the actual position of said plunger means sensed by said position sensor;

difference calculating means connected to said position sensor and said calculation means, for calculating a difference between the sensed actual position and the desired position;

second comparison means, connected to said difference calculating means, for comparing the calculated difference with a predetermined value; and valve control means, connected to said first and second comparison means and said inlet and outlet electromagnetic valves, for electrically controlling the openings and closing of said inlet and outlet electromagnetic valves, said valve control means determining, in response to a comparison result of said second comparison means indicating that said calculated difference is larger than the predetermined value, (a) that one of said inlet and outlet electromagnetic valves is to be opened continuously, while (b) the other thereof is to be closed continuously, and in response to a comparison result of said first comparison means, to which electromagnetic valve is to be opened, and said valve control means, in response to a comparison result of said second comparison means indicating that said calculated difference is smaller than the predetermined value, determining (a) that one of said inlet and outlet electromagnetic valves is to be opened intermittently with pulses of a first predetermined width, while (b) the other thereof is to be closed intermittently with pulses of a second predetermined width which is different from said first predetermined width, and in response to the comparison result of said first comparison means to which electromagnetic valve the pulses of the first predetermined width is to be applied.

2. A system according to claim 1, further comprising:

third comparison means, connected to said difference calculating means and said valve control means, for comparing the calculated difference with a second predetermined value which is smaller than said predetermine value;

said valve control means, in response to a comparison output of said third comparison means indicating that said second predetermined value is in excess of the calculated difference, causing both said inlet and outlet electromagnetic valves to close their respective passages.

3. A system for controlling the position of plunger means comprising:

a source of hydraulic medium;

a pump for pressurizing the hydraulic medium;

a housing having a closed end;

plunger means slidably fitted inside said housing, said plunger means forming with said housing a hydraulic chamber;

biasing means for biasing said plunger means axially;

an inlet passage communicated with said pump and said hydraulic chamber for introducing the pressurized hydraulic medium from the pump to the hydraulic chamber to thereby bias said plunger means against said biasing means;

an outlet passage communicated with said hydraulic chamber and said source of hydraulic medium for returning the hydraulic medium thereto;

an inlet electromagnetic valve positioned in said inlet passage for opening and closing said inlet passage;

an outlet electromagnetic valve positioned in said outlet passage for opening and closing said outlet passage;

a first control unit for calculating a variable desired position for said plunger means and for generating a desired position signal indicative thereof; and a second control unit, responsive to said actual position signal and said desired position signal, for controlling said plunger means to a variable desired position, said second control unit including:

a first comparator for comparing said actual position signal with said desired position signal;

an absolute value circuit for calculating an absolute value of a difference between said actual position signal and said desired position signal;

means for generating a predetermined first set value signal and a predetermined second set value signal which is smaller than said first set value signal;

a second comparator for comparing an output signal of said absolute value circuit with said first set value signal;

a third comparator for comparing the output signal of said absolute value circuit with said second set value signal;

a timer circuit connected to said second and third comparators, for generating two trains of pulses having pulse widths different from each other, the occurrence of the trains of the pulses being stopped when said third comparator determines that the output signal of said absolute value circuit is smaller than said second set value signal; and circuit means for (a) in response to the respective trains of pulses of different pulse widths when said second comparator determines that the output signal of said absolute value circuit is smaller than said first set value signal during a period that the trains of the pulses are generated from said timer circuit, for rendering said inlet and outlet electromagnetic valves to intermittently open their respective passages, and (b) in response to said second comparator determining that the output signal of said absolute value circuit is larger than said first set value signal, rendering one of said inlet and outlet electromagnetic valves to continuously open its passage and rendering the other thereof to continuously close its passage in accordance with an output signal of said first comparator.

4. A system for controlling the position of plunger means comprising:

a source of hydraulic medium;

a pump for pressurizing the hydraulic medium;

a housing having a closed end;

plunger means slidably fitted inside said housing, said plunger means forming with said housing a hydraulic chamber;

biasing means for biasing said plunger means axially;

an inlet passage communicated with said pump and said hydraulic chamber for introducing the presurized hydraulic medium from the pump to the hydraulic chamber to thereby reversely bias said plunger means against said biasing means;

an outlet passage communicated with said hydraulic chamber and said source of hydraulic medium for returning the hydraulic medium from the former to the latter;

an inlet electromagnetic valve positioned in said inlet passage for opening and closing said inlet passage;

an outlet electromagnetic valve positioned in said outlet passage for opening and closing said outlet passage;

a position sensor for sensing an actual position of said plunger means to generate an actual position signal indicative thereof;

a first control unit for calculating a variable desired position for said plunger means and for generating a desired position signal indicative thereof; and a second control unit, responsive to said actual position signal and said desired position signal, for controlling said plunger means to a variable desired position, said second control unit causing a difference between valve opening periods of said first and second electromagnetic valves in response to a sign and magnitude of a deviation between said actual position signal and said desired position signal, the difference between the valve opening periods being (a) larger than a predetermined difference when the magnitude of the deviation is larger than a first set value (b) zero, to render both said inlet and outlet valves to close their passages, when the magnitude of the deviation is smaller than a second predetermined value which is smaller than said first predetermined value, and (c) an intermediate value when the magnitude of the deviation is intermediate between said first and second predetermined values.

* * * * *